(12) United States Patent
Hudson et al.

(10) Patent No.: US 11,115,191 B2
(45) Date of Patent: Sep. 7, 2021

(54) SYSTEM AND METHOD FOR MODIFYING CONTENT STORED IN A BLOCKCHAIN

(71) Applicant: HCL America Inc, Sunnyvale, CA (US)

(72) Inventors: Michael James Hudson, Boca Raton, FL (US); Predrag Maksimovic, Boca Raton, FL (US); Vladimir Peric, Boca Raton, FL (US)

(*) Notice: Subject to any disclaimer, the term of this patent is extended or adjusted under 35 U.S.C. 154(b) by 327 days.

(21) Appl. No.: 16/427,352

(22) Filed: May 31, 2019

(65) Prior Publication Data

US 2020/0382282 A1 Dec. 3, 2020

(51) Int. Cl.
*H04L 29/06* (2006.01)
*H04L 9/06* (2006.01)
*H04L 9/32* (2006.01)
*G06F 16/182* (2019.01)

(52) U.S. Cl.
CPC ........ *H04L 9/0643* (2013.01); *G06F 16/1824* (2019.01); *H04L 9/3268* (2013.01); *H04L 2209/38* (2013.01)

(58) Field of Classification Search
CPC . H04L 9/0643; H04L 9/3268; H04L 2209/38; H04L 63/123; H04L 51/12; H04L 9/3239; G06F 16/1824; G06F 16/9024
See application file for complete search history.

(56) References Cited

U.S. PATENT DOCUMENTS

| 9,774,578 | B1* | 9/2017 | Ateniese | ................. G06F 21/53 |
| 9,785,369 | B1* | 10/2017 | Ateniese | ............... H04L 9/3221 |
| 9,967,096 | B2 | 5/2018 | Ateniese et al. | |
| 10,171,509 | B2 | 1/2019 | Anderson et al. | |
| 10,805,067 | B1* | 10/2020 | Griffin | ................. H04L 9/0643 |
| 2016/0300234 | A1 | 10/2016 | Moss-Pultz et al. | |
| 2017/0345011 | A1 | 11/2017 | Salami et al. | |
| 2018/0219669 | A1* | 8/2018 | Chen | ...................... H04L 9/002 |
| 2018/0241573 | A1* | 8/2018 | Ramathal | ............... G16H 30/20 |
| 2019/0222586 | A1* | 7/2019 | Sachkov | ............. H04L 63/1416 |
| 2019/0354944 | A1* | 11/2019 | Russinovich | ......... H04L 9/3239 |
| 2020/0112440 | A1* | 4/2020 | Nakamura | ............ H04L 9/0891 |
| 2020/0119904 | A1* | 4/2020 | Philyaw | ................ H04L 9/0637 |
| 2021/0143974 | A1* | 5/2021 | Bartolucci | ............ H04L 9/3213 |

* cited by examiner

*Primary Examiner* — Harunur Rashid
(74) *Attorney, Agent, or Firm* — Kendal Sheets

(57) ABSTRACT

Disclosed is a method and system for modifying content stored in a blockchain. The method comprises identifying an old block of the blockchain comprising undesired data in a transaction of the old block. An updated block may be created by correcting the transaction of the old block. A new block hash may be determined for the updated block. Corrected form of the transaction may be submitted, as a new transaction, along with the new block hash and the difference between the new block hash and hash of the old block. Miners may be allowed to mine the corrected form of the transaction, along with other new transactions. The other new transactions may be mined, based on a consensus of users of the blockchain, into a new block connected to a tip of the blockchain, and the old block may be edited to introduce the corrected form of the transaction.

9 Claims, 4 Drawing Sheets

SYSTEM AND METHOD FOR MODIFYING CONTENT STORED IN A BLOCKCHAIN

CROSS-REFERENCE TO RELATED APPLICATIONS AND PRIORITY

The present application does not claim priority from any patent application.

TECHNICAL FIELD

The present subject matter described herein, in general, relates to blockchains, and more particularly to a system and a method for modifying content stored in a blockchain.

BACKGROUND

A blockchain is a growing list of records that are stored as blocks. In a blockchain, each block is linked with its previous block, except the initial block, called the genesis block, which does not have a previous block. Further, each block contains a cryptographic hash of the previous block (when the previous block exists), a timestamp, and transaction data. By design, a blockchain is resistant to modification of data stored in the blocks.

Sometimes, it may occur that blocks in an established blockchain contain undesirable or invalid content, errors, vandalization, pornography, etc. Presence of such objectionable content in the blockchain could jeopardize its usage. Given the immutable nature of blockchains, it is ordinarily not possible to modify these blocks once they become part of a chain.

Conventional solutions for modifying data stored in a blockchain, such as one described in U.S. Pat. No. 9,774,578B1, provides usage of a new hash function called chameleon hash. To modify data stored in any block, block chain admin(s) are required for them having private keys needed to modify the chameleon hash values. Therefore, there remains an immense need of a method to modify any data stored in a blockchain after the data is mined, without introducing new special entities for authorizing or performing such modifications, thus preserving the decentralized nature of the blockchain.

SUMMARY

Before the present systems and methods for modifying content stored in a blockchain, are described, it is to be understood that this application is not limited to the particular systems, and methodologies described, as there can be multiple possible embodiments which are not expressly illustrated in the present disclosures. It is also to be understood that the terminology used in the description is for the purpose of describing the particular implementations or versions or embodiments only, and is not intended to limit the scope of the present application.

This summary is provided to introduce aspects related to a system and a method for modifying content stored in a blockchain. This summary is not intended to identify essential features of the claimed subject matter nor is it intended for use in determining or limiting the scope of the claimed subject matter.

In one implementation, a system for modifying content stored in a blockchain is disclosed. In one aspect, the system comprises a memory and a processor coupled to the memory. Further, the processor may be capable of executing instructions in the memory to perform one or more steps. In the aspect, the system may identify an old block of the blockchain comprising undesired data in at least one transaction of the old block. An updated block may be created by allowing a user to correct the at least one transaction of the old block. The system may determine a new block hash for the updated block. The corrected form of the at least one transaction may be submitted, as a new transaction, along with the new block hash and the difference between the new block hash and hash of the old block as an offset. The system may allow participants in the network capable of appending new blocks (miners) to append (mine) the corrected form of the at least one transaction, along with other new transactions. The other new transactions may be mined, based on a consensus of users of the blockchain, into a new block connected to a tip of the blockchain. Further, the old block may be edited to introduce the corrected form of the at least one transaction.

In one implementation, a method for modifying content stored in a blockchain is disclosed. In one aspect, the method may comprise identifying, by an identification module, an old block of the blockchain comprising undesired data in at least one transaction of the old block. The method may further comprise creating, by a creation module, an updated block by allowing a user to correct the at least one transaction of the old block. The method may further comprise determining, by a determination module, a new block hash for the updated block. The method may further comprise submitting as a new transaction, by a submitting module, corrected form of the at least one transaction, along with the new block hash and the difference between the new block hash and hash of the old block as an offset. The method may further comprise allowing, by an allowing module, miners to mine the corrected form of the at least one transaction, along with other new transactions. The method may further comprise mining, by a mining module, based on a consensus of users of the blockchain, the other new transactions into a new block connected to a tip of the blockchain, and editing the old block to introduce the corrected form of the at least one transaction.

In yet another implementation, non-transitory computer readable medium embodying a program executable in a computing device for modifying content stored in a blockchain is disclosed. In one aspect, the program may comprise a program code for identifying an old block of the blockchain comprising undesired data in at least one transaction of the old block. The program may further comprise a program code for creating an updated block by allowing a user to correct the at least one transaction of the old block. The program may further comprise a program code for determining a new block hash for the updated block. The program may further comprise a program code for submitting, as a new transaction, corrected form of the at least one transaction, along with the new block hash and the difference between the new block hash and hash of the old block as an offset. The program may further comprise a program code for allowing miners to mine the corrected form of the at least one transaction, along with other new transactions. The program may further comprise a program code for mining, based on a consensus of users of the blockchain, the other new transactions into a new block connected to a tip of the blockchain, and editing the old block to introduce the corrected form of the at least one transaction.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and system disclosed in the document and the figures.

The present subject matter is described in detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods for modifying content stored in a blockchain, similar or equivalent to those described herein can be used in the practice or testing of embodiments of the present disclosure, the exemplary, systems and methods for modifying content stored in a blockchain are now described. The disclosed embodiments for modifying content stored in a blockchain are merely examples of the disclosure, which may be embodied in various forms.

Various modifications to the embodiment will be readily apparent to those skilled in the art and the generic principles herein may be applied to other embodiments for modifying content stored in a blockchain. However, one of ordinary skill in the art will readily recognize that the present disclosure for modifying content stored in a blockchain is not intended to be limited to the embodiments described, but is to be accorded the widest scope consistent with the principles and features described herein.

Figure 1:
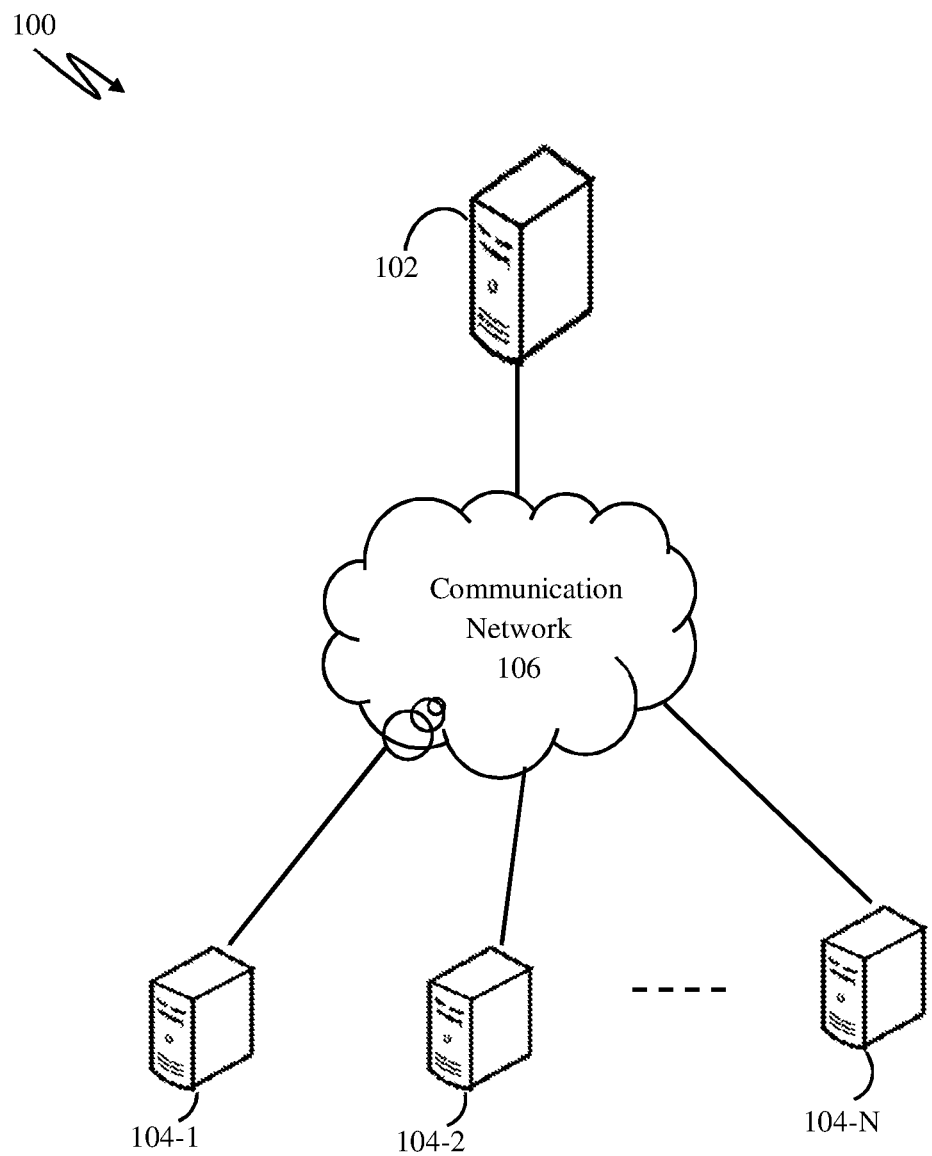
FIG. 1 illustrates a network architecture diagram 100 of a system 102 and user devices 104 connected together to store content of a blockchain, in accordance with an embodiment of the present subject matter.

Referring now to FIG. 1, a network implementation diagram 100 of a system 102 for modifying content stored in a blockchain, in accordance with an embodiment of the present subject matter may be described. In one example, the system 102 may be connected with several other devices 104-1 through 104-N (collectively referred as 104) through a communication network 106.

It should be understood that the system 102 and the devices 104 are different computing devices used by different users. All such different devices, 102 and 104, together store all the data integral for the blockchain. The content of the entire blockchain may be replicated across all devices, 102 and 104. The method of modifying content stored in the blockchain initiates at a particular user device, and such user device is henceforth referred as the system 102. It may be understood that the system 102 and the devices 104 may also be implemented in a variety of computing systems, such as a laptop computer, a desktop computer, a notebook, a workstation, a mainframe computer, a server, a network server, a cloud-based computing environment, or a mobile and the like. The system 102 and the user devices 104 may store and use secure information provided by the users to establish their identity on the network and to digitally sign data transactions and other activities in the network. This private information may be present in form of passwords, private/public key pairs, digital wallets, and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example, MQ Telemetry Transport (MQTT), Extensible Messaging and Presence Protocol (XMPP), Hypertext Transfer Protocol (HTTP), Transmission Control Protocol/Internet Protocol (TCP/IP), Wireless Application Protocol (WAP), and the like, to communicate with one another. Further, the communication network 106 may include a variety of network devices, including routers, bridges, servers, computing devices, storage devices, and the like. The communication network 106 may be organized as a peer to peer (P2P) network, where the system 102 and user devices 104 represent peer nodes with equivalent roles in the network.

Figure 2:
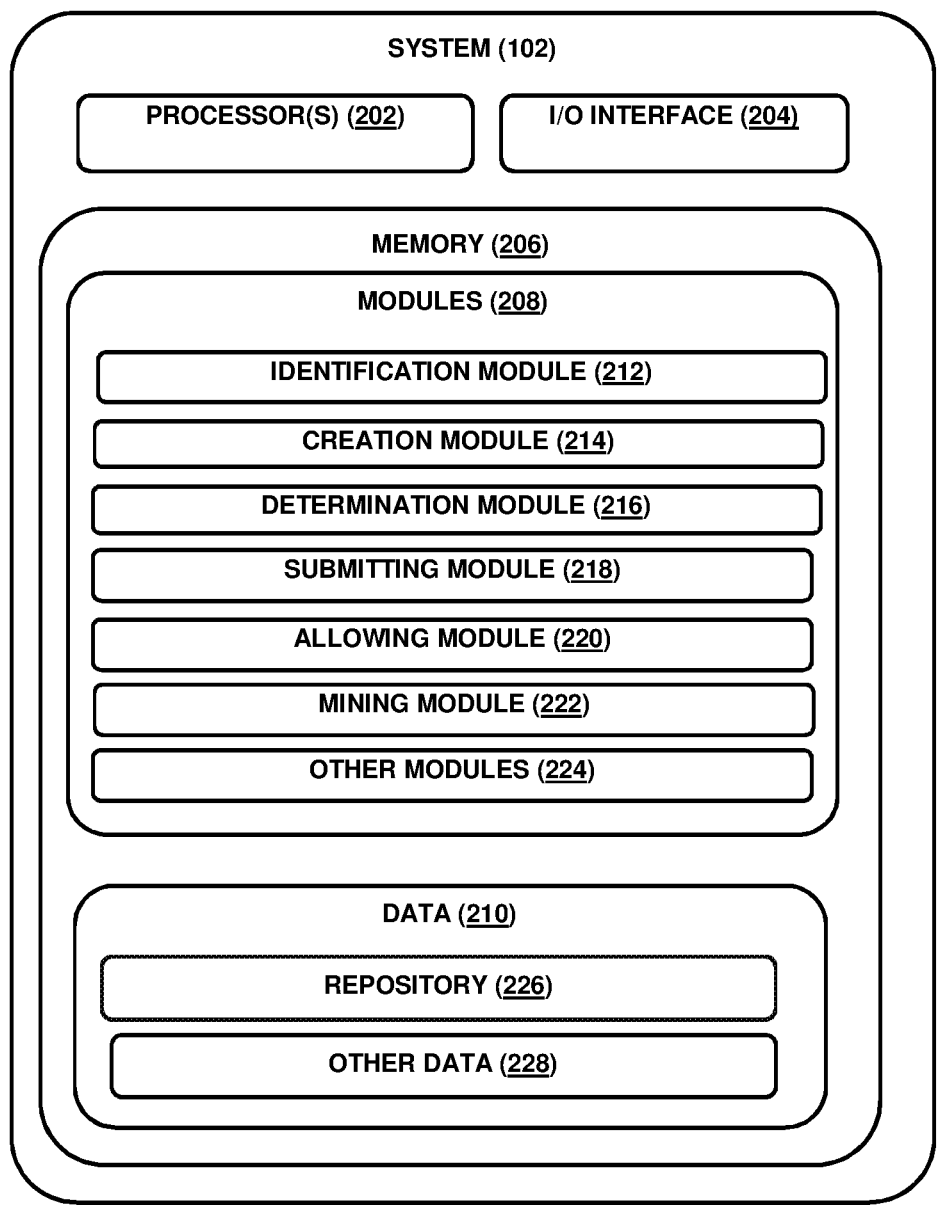
FIG. 2 illustrates a block level diagram of the system 102, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, a command line interface, and the like. The I/O interface 204 may allow a user to interact with the system 102. Further, the I/O interface 204 may enable the system 102 to communicate with the user devices 104, and other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206, amongst other things, serves as a repository for storing data processed, received, and generated by one or more of modules 208. The memory 206 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 206 may include data generated as a result of the execution of one or more of the modules 208. In one implementation, the memory 206 may include data 210. The modules 208 include routines, programs, objects, components, data structures, etc., which perform particular tasks or implement particular abstract data types. In one implementation, the modules 208 may include an identification module 212, a creation module 214, a determination module 216, a submitting module 218, an allowing module 220, a mining module 222, and other modules 224. The other modules 224 may include programs or coded instructions that supplement applications and functions of the system 102. The modules 208 described herein may be implemented as software modules that may be executed in the cloud-based computing environment of the system 102.

The data 210 may include a repository 226 for storing data processed, computed, received, and generated by one or more of the modules 208. Furthermore, the data 210 may include other data 228 for storing data generated as a result of the execution of one or more modules in the other modules 224.

In one implementation, at first, an old block of a blockchain, storing undesired data in a transaction of the old block may be identified by the identification module 212. In one case, the undesired data may correspond to an illicit content, stored by one or more users in one or more transactions present in the old block. For example, a blockchain made up of blocks B1, B2, B3, and B4 may include the undesired data in a transaction Tx present inside the block B2. Such an aspect is clarified using an exemplary blockchain structure provided below.

B4: header=dddd (which hashes to 4444)
T1= . . .
T2= . . .
. . .
Tn= . . .
lastblockhash:3333
B3: header=cccc (which hashes to 3333)
T1= . . .
T2= . . .
. . .
Tn= . . .
lastblockhash:1234
B2: header=bbbb (which hashes to 1234)
T1= . . .
Tx=a1a2a3 a4BADWORDa5 a6
Tn= . . .
lastblockhash:1111
B1: header=aaaa (which hashes to 1111)
T1= . . .
T2= . . .
. . .
Tn= . . .
lastblockhash:0000

It is shown above that the transaction Tx of block B2 comprises the undesired data shown as "a1a2a3a4BADWORDa5a6." The creation module 214 may allow a user to access the transaction Tx to correct, replace, or eliminate the undesired data, and thereby creating an updated block. The determination module 216 may determine a new block hash for the updated block. Thereupon, corrected form of the transaction Tx may be submitted as a new transaction.

In one embodiment, a difference between the new block hash and a hash of the old block may be determined. Along with the corrected form of the transaction Tx, the new block hash and the difference between the new block hash and the hash of the old block may also be submitted by the submitting module 218, as the new transaction. The difference between the new block hash and the hash of the old block is also called an offset. In one case, corrected form of the transaction Tx may be submitted as "B2:Tx:a1a2a3a4XXXXXXXa5a6:1233:1," indicating that transaction Tx in block B2 should be "a1 a2a3a4XXXXXXXa5a6" and the new block hash is "1233" which is "1" less than the hash of the old block B2 by the offset i.e. "1." Although, in above example, value of the offset is illustrated to carry a positive value, in other cases, the offset may carry a negative value, such as "−1" It should be understood that while value of the offset is negative, the new block hash may be greater than the hash of the old block.

Thereupon, the allowing module 220 may allow miners to mine the corrected form of the transaction Tx. Miners may be used as an alternate term to the users, in current disclosure. Further, the miners may also mine other new transactions. The corrected form of the transaction Tx could also be validated using one of the several known techniques. New corrected records such as the corrected form of the transaction Tx may be stored in dedicated correction blocks. These dedicated correction blocks may be mined by special purpose nodes.

In one embodiment, a block B5 may be mined, and may be added to tip of the blockchain, by the mining module 222. In one case, the block B5 may include 'correction' transaction for editing the block B2. Further, the block B2 may be edited. While the block B2 is edited, transaction Tx may be replaced, and header of the block B2 may be recalculated by hashing new transactions of the block B2 along with other meta data. The new transactions of the block B2 may be hashed into a new Merkle Root value. Upon hashing the new transactions, a new nonce may be determined. The new nonce may depend on a new, and possibly less difficult target.

In one embodiment, the exemplary blockchain structure may be modified as provided below.

B5: header=eeee (which hashes to 7890)
T1="B2:Tx:a1a2a3a4XXXXXXXa5a6:1233:1"
T2= . . .
. . .
Tn= . . .
lastblockhash:4444
B4: header=dddd (which hashes to 4444)
T1= . . .
T2= . . .
. . .
Tn= . . .
lastblockhash:3333
B3: header=cccc (which hashes to 3333)
T1= . . .
T2= . . .
. . .
Tn= . . .
lastblockhash:1234
B2: header=wxyz (which hashes to 1233)
T1= . . .
Tx=a1 a2 a3 a4XXXXXXXa5 a6
. . .
Tn= . . .
lastblockhash:1111
B1: hashed_header=aaaa (which hashes to 1111)
T1= . . .
T2= . . .
. . .
Tn= . . .
lastblockhash:0000

In one embodiment, all the blocks of the blockchain may be validated. Each block, starting from tip of the blockchain, may be validated. When block B5 is discovered, the correction transaction may be identified and the offset, "1", may be recorded for block B3, it is identified if hash of block B3 is exactly "1" more than the hash of block B2. Is so, block B3 is declared valid, else block B3, and therefore the entire blockchain is identified to be invalid. As shown above, hash of the block B3 (i.e. 1234) is exactly greater than hash of the block B2 (i.e. 1233) by a value of '1.'

Computation of block hash of the updated block may be significantly less difficult than computation of block hash of the old block, or computation of block hash of the new block. This is because the new transaction is validated in the new block, with current difficulty. The only requirement for the new block hash of the updated block is that it must be trivial to validate the new block hash. Proof of work is not needed to recalculate the new block hash and the correction i.e. difference between the new block hash and the hash of the old block, since the proof of work is done to chain a new transaction that corrects an old transaction.

Exemplary embodiments for modifying content stored in a blockchain, as discussed above, may provide certain advantages. Though not required to practice aspects of the disclosure, these advantages may include those provided by the following features.

Some embodiments of the system and the method allow the users to update content stored in a blockchain despite the distributed and immutable nature of blockchains.

Some embodiments of the system and the method enable the users to delete or edit any illegal content stored in any block of a blockchain.

Figure 3:
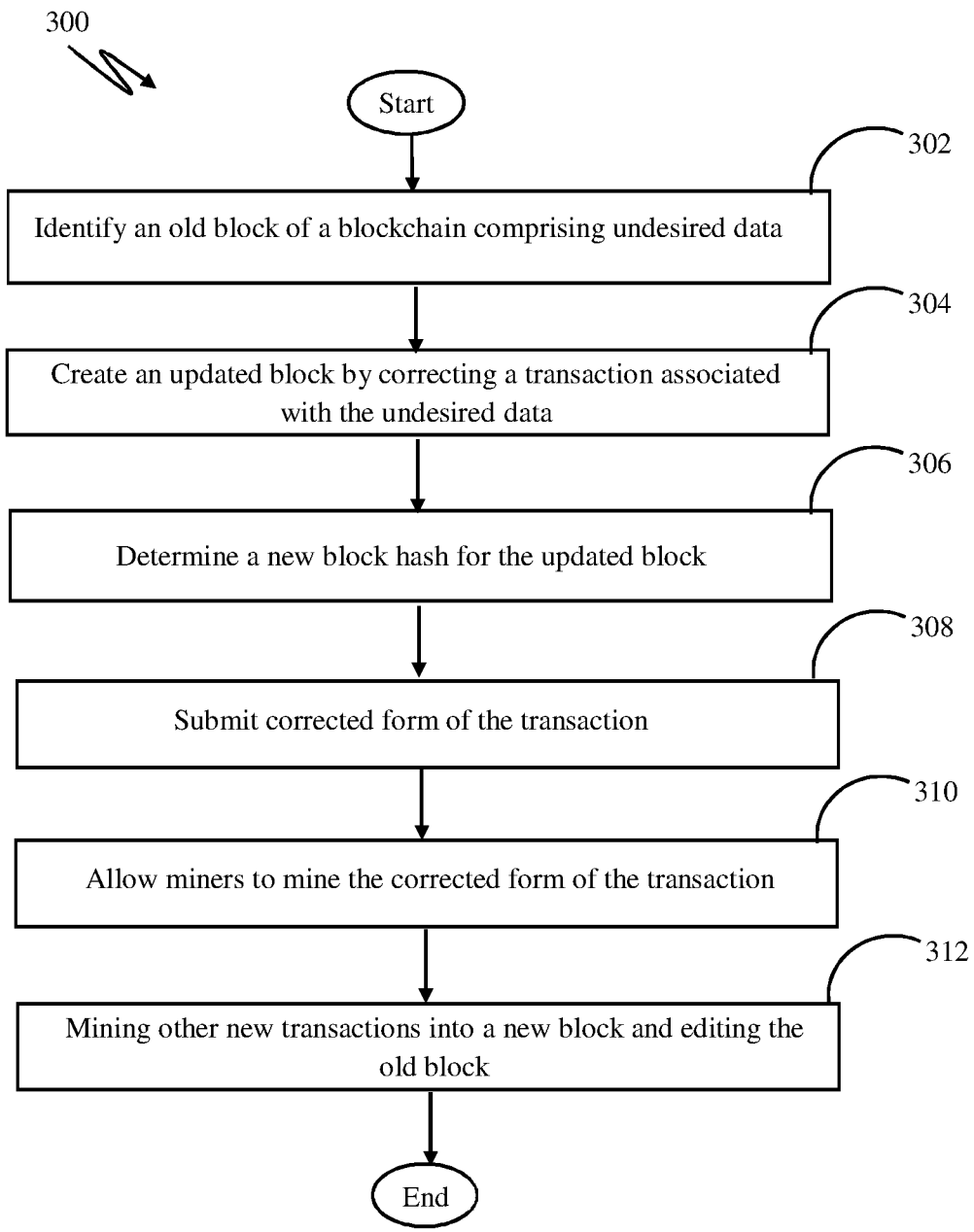
FIG. 3 illustrates a method 300 for modifying content stored in a blockchain, in accordance with an embodiment of the present subject matter.
Figure 4:
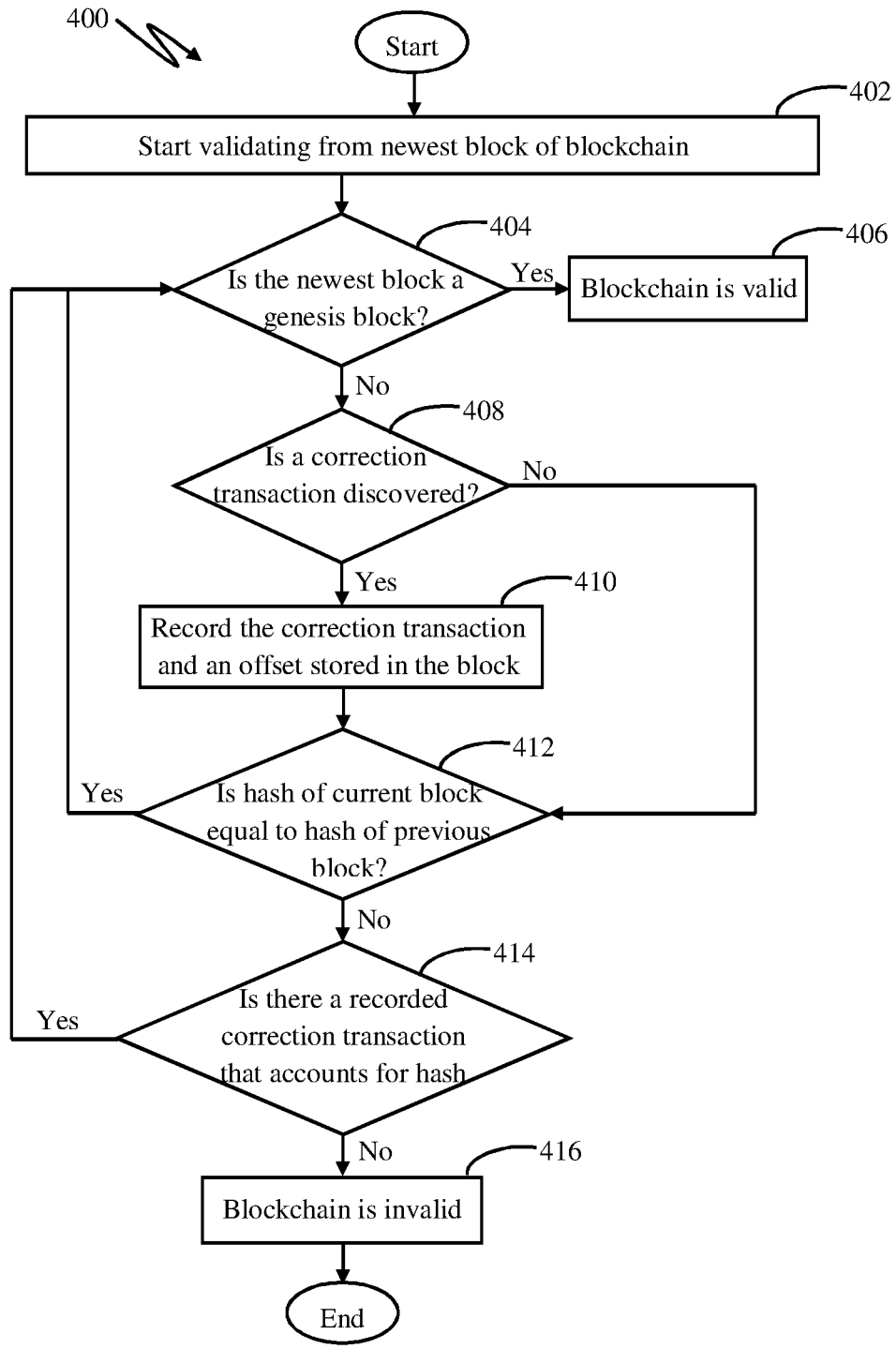
FIG. 4 illustrates a method 400 for validating blocks present in a blockchain, in accordance with an embodiment of the present subject matter.

Referring now to FIG. 3 and FIG. 4, a method 300 for modifying content stored in a blockchain and a method 400 for validating blocks present in the blockchain are described, in accordance with an embodiment of the present subject matter. The methods 300 and 400 may be described in the general context of computer executable instructions. Generally, computer executable instructions can include routines, programs, objects, components, data structures, procedures, modules, functions, etc., that perform particular functions or implement particular abstract data types.

The order in which the method 300 for modifying content stored in a blockchain and the method 400 for validating blocks present in a blockchain are described is not intended to be construed as a limitation, and any number of the described method blocks can be combined in any order to implement the methods 300 and 400 or alternate methods. Additionally, individual blocks may be deleted from the methods 300 and 400 without departing from the spirit and scope of the subject matter described herein. Furthermore, the method can be implemented in any suitable hardware, software, firmware, or combination thereof. However, for ease of explanation, in the embodiments described below, the methods 300 and 400 may be considered to be implemented in the above described system 102.

At block 302, an old block of the blockchain comprising undesired data in at least one transaction of the old block may be identified by the identification module 212.

At block 304, an updated block may be created by the creation module 214. The updated block may be created by allowing a user to correct the at least one transaction of the old block.

At block 306, a new block hash may be determined for the updated block. In one implementation, the new block hash may be determined by the determination module 216.

At block 308, corrected form of the at least one transaction may be submitted, along with the new block hash and the difference between the new block hash and hash of the old block, as an offset. In one implementation, the corrected form of the at least one transaction, the new block hash, and the offset may be submitted by the submitting module 218.

At block 310, miners may be allowed by the allowing module 220 to mine the corrected form of the at least one transaction, along with other new transactions.

At block 312, the other new transactions may be mined by the mining module 222. The other new transactions may be mined based on a consensus of users of the blockchain. Further, the other new transactions may be mined into a new block connected to a tip of the blockchain. Further, the old block may be edited to introduce the corrected form of the at least one transaction.

At step 402, Validation procedure may be initiated from a newest block of the blockchain.

At step 404, it may be determined if the newest block is a genesis block. If the newest block is found to be the genesis block, the blockchain may be declared valid, at step 406, else the control may be transferred at block 408.

At step 408, it may be determined if a correction transaction is discovered. Control may be transferred at block 410 while the correction transaction is discovered, else the control may be transferred at block 412.

At step 410, the correction transaction may be recorded and an offset may be stored in the block.

At step 412, it may be determined if hash of current block is equal to hash of previous block. In case the hash of the current block is found to be equal to the hash of the previous block, control may be transferred to step 404; else the control may be transferred to step 414.

At step 414, it may be determined if there exists a recorded correction transaction that accounts for the hash. In case, such recorded correction transaction exists, control may be transferred to block 404; else the control may be transferred to block 416 where the blockchain may be declared invalid.

Although implementations for methods and systems for modifying content stored in a blockchain have been described in language specific to structural features and/or methods, it is to be understood that the appended claims are not necessarily limited to the specific features or methods described. Rather, the specific features and methods are disclosed as examples of implementations for modifying content stored in a blockchain.

The invention claimed is:

1. A method of modifying content stored in a blockchain, the method comprising:
    identifying, by an identification module, an old block of the blockchain comprising undesired data in at least one transaction of the old block;
    creating, by a creation module, an updated block by allowing a user to correct the at least one transaction of the old block;
    determining, by a determination module, a new block hash for the updated block;
    submitting as a new transaction, by a submitting module, corrected form of the at least one transaction, along with the new block hash and the difference between the new block hash and hash of the old block as an offset;
    allowing, by an allowing module, miners to mine the corrected form of the at least one transaction, along with other new transactions; and
    mining, by a mining module, based on a consensus of users of the blockchain, the other new transactions into a new block connected to a tip of the blockchain, and editing the old block to introduce the corrected form of the at least one transaction;

the method further comprising:

validating a block subsequent to an edited old block if sum of a hash of the block subsequent to the edited old block is identified to be equal to a sum of the hash of the edited old block and the offset discovered from the new block; and identifying entire blockchain to be invalid while the block subsequent to the edited old block is identified to be invalid.

2. The method as claimed in claim 1, further comprising storing the corrected form of the at least one transaction in dedicated correction blocks.

3. The method as claimed in claim 1, further comprising determining header of the old bock post editing by hashing new transactions of the old block along with other meta data.

4. The method as claimed in claim 3, wherein the new transactions of the old block are hashed into a new Merkle Root value.

5. A system for modifying content stored in a blockchain, the system comprising:

a memory; and a processor coupled to the memory, wherein the processor is capable of executing instructions to perform steps of:

identifying an old block of the blockchain comprising undesired data in at least one transaction of the old block;

creating an updated block by allowing a user to correct the at least one transaction of the old block;

determining a new block hash for the updated block;

submitting, as a new transaction, corrected form of the at least one transaction, along with the new block hash and the difference between the new block hash and hash of the old block as an offset;

allowing miners to mine the corrected form of the at least one transaction, along with other new transactions; and mining, based on a consensus of users of the blockchain, the other new transactions into a new block connected to a tip of the blockchain, and editing the old block to introduce the corrected form of the at least one transaction, and wherein the processor is capable of executing further instructions to perform steps of:

validating a block subsequent to an edited old block if sum of a hash of the block subsequent to the edited old block is identified to be equal to a sum of the hash of the edited old block and the offset discovered from the new block; and identifying entire blockchain to be invalid while the block subsequent to the edited old block is identified to be invalid.

6. The system as claimed in claim 5, further comprising storing the corrected form of the at least one transaction in dedicated correction blocks.

7. The system as claimed in claim 5, further comprising determining header of the old bock post editing by hashing new transactions of the old block along with other meta data.

8. The system as claimed in claim 7, wherein the new transactions of the old block are hashed into a new Merkle Root value.

9. A non-transitory computer program product having embodied thereon a computer program for modifying content stored in a blockchain, the computer program product storing instructions for:

identifying an old block of the blockchain comprising undesired data in at least one transaction of the old block;

creating an updated block by allowing a user to correct the at least one transaction of the old block;

determining a new block hash for the updated block;

submitting, as a new transaction, corrected form of the at least one transaction, along with the new block hash and the difference between the new block hash and hash of the old block as an offset;

allowing miners to mine the corrected form of the at least one transaction, along with other new transactions;

mining, based on a consensus of users of the blockchain, the other new transactions into a new block connected to a tip of the blockchain, and editing the old block to introduce the corrected form of the at least one transaction;

validating a block subsequent to an edited old block if sum of a hash of the block subsequent to the edited old block is identified to be equal to a sum of the hash of the edited old block and the offset discovered from the new block; and identifying entire blockchain to be invalid while the block subsequent to the edited old block is identified to be invalid.

* * * * *